April 14, 1970   J. G. BERMAN, JR., ET AL   3,506,843
OPTICAL DEVICES UTILIZING NONLINEAR HALATE CRYSTALS
Filed March 28, 1968

INVENTORS J. G. BERGMAN, JR.
S. K. KURTZ
BY
*George S. Indig*
ATTORNEY

United States Patent Office 3,506,843
Patented Apr. 14, 1970

3,506,843
OPTICAL DEVICES UTILIZING NONLINEAR HALATE CRYSTALS
John G. Bergman, Jr., Farmingdale, and Stewart K. Kurtz, Berkeley Heights, N.J., assignors to Bell Telephone Laboratories, Incorporated, Murray Hill, N.J., a corporation of New York
Filed Mar. 28, 1968, Ser. No. 716,956
Int. Cl. H03f 7/00; H02m 5/06
U.S. Cl. 307—88.3         3 Claims

ABSTRACT OF THE DISCLOSURE

A class of halate materials exemplified by certain of the iodates and bromates is found to have nonlinear device properties. Resulting devices which may operate at light frequencies include second harmonic generators, parametric oscillators, and other parametric devices.

BACKGROUND OF THE INVENTION

(1) Field of the invention

The invention is concerned with second harmonic generation and parametric interaction of electro-magnetic radiation in the visible band. Devices operating in such manner as known as nonlinear, and their chief use is in the extension of the few presently available coherent radiation frequencies both to higher frequencies (by second harmonic generation) and to frequencies intermediate, the harmonic and fundamental (by parametric interaction).

(2) Description of the prior art

It is now expected that at least solid state laser sources are not likely to extend to fundamntal frequencies substantially above those having wavelengths of about 7000 angstrom units. Further, at least for CW operation, there are very few available solid state coherent sources even at lower frequencies. It is apparent that, at least for the intermediate period, the lacking will be made up by use of the so called "nonlinear" materials.

Devices dependent upon the properties of the nonlinear materials rely on the fact that the electric polarization is frequency dependent. The earliest nonlinear devices were second harmonic generators (SHG). At this time, SHG devices are an accepted part of the art, and they are regularly used for doubling the frequency of the usual infrared sources so as to result in output emission at wavelengths of the order of 5000 angstrom units. SHG devices may work pulse or continuous. Their apparent efficiency may be raised to very high values by specific design approaches.

With SHG an accomplished fact, increased attention was directed to parametric operation capable of producing a continuum of frequencies intermediate the outputs of the laser and the SHG. Parametric oscillators have recently been made to operate continuously. Output frequency in such devices may be selected by various types of tuning mechanisms.

Probably the most significant problem to be overcome in the nonliear materials was that due to dispersion (frequency dependent velocity of propagation). Early nonlinear devices suffered from the fact that the variation in velocity between two different frequency waves resulted in periodic reinforcement and subtraction such that effective reaction was realized only over the relatively short distance over which the two waves were substantially in phase. The more generally accepted solution to this problem was described by J. A. Giordmaine in vol. 8, Physics Review Letter (1962). Giordmaine suggested utilizing a crystal with sufficient birefringence such that use of an appropriate polarization direction permitted velocity matching of the ordinary ray of one frequency with the extraordinary ray of the other.

While the various developments in the nonlinear art have permitted practical continuous generation of a broad range of light frequencies, a practical obstacle to the widespread adaptation of this approach remains. For materials to meet the device requirements, they must be sufficiently transparent over a bandwidth including all frequencies of concern, they must have a significant nonlinear coefficient and they must have sufficient birefringence to permit compensation for the dispersion which is invariably present. Only a very small number of materials of device promise have emerged. Three of these have been made available and have found use in reported devices. Perhaps the best and also the most recent is $Ba_2NaNb_5O_{15}$, see vol. 11, Applied Physics Letters, p. 269 (November 1967).

While $Ba_2NaNb_5O_{15}$ can be grown in sufficiently large, sufficiently perfect crystal section by Czochralski, growth rates must be carefull monitored and the resulting crystals are costly. At least over this intermediate period, a need exists for suitable device quality materials which are more readily available.

SUMMARY OF THE INVENTION

A class of halate crystals has been found to have nonlinear properties of device interest. Birefringence values are sufficient to permit phase matching. Transparency range and chemical and physical stability are sufficient for most purposes. Most significant, from the growth standpoint, all included compositions are soluble in a number of solvents including water. Unlike $Ba_2NaNb_5O_{15}$, therefore, growth may be carried out at moderate temperatures.

Strains due to poorly controlled temperature and temperature gradients, significant problems in those materials which can only be grown in high temperatures, are so avoided.

This invention is the outgrowth of an extensive survey of the available halates. Every composition listed has been found to have a substantial nonlinear coefficient and to be sufficiently birefringent for phase matching. Included materials are all iodates or bromates. Of these two groups, the iodates are preferred since they, in general, possess larger, nonlinear coefficients. A preference also exists for anhydrous materials, it appearing that water of hydration tends to diminish acentricity. Included materials are:

Iodic acid—$HIO_3$
Ammonium iodate—$NH_4IO_3$
Rubidium iodate—$RbIO_3$
Thallium iodate—$TlIO_3$
Potassium iodate—$KIO_3$
Lithium iodate—$LiIO_3$
Silver iodate—$AgIO_3$
Zinc iodate—$Zn(IO_3)_2$
Thallium bromate—$TlBrO_3$
Cadmium bromate—$Cd(BrO_3)_2 \cdot 2H_2O$
Mercury bromate—$Hg(BrO_3)_2 \cdot 2H_2O$
Potassium bromate—$KBrO_3$

DETAILED DESCRIPTION

(1) Theoretical consideration

Figure 1:
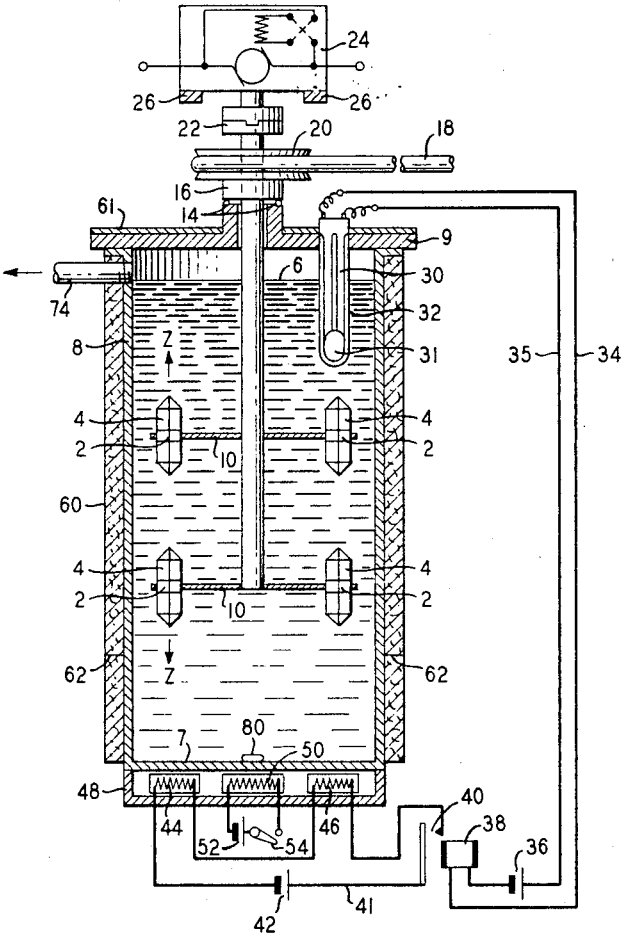
FIG. 1 is a front elevational view, partly in section, of crystal growing apparatus suitable for the growth of the inventive materials.

Materials which may beneficially be incorporated in nonlinear devices in accordance with the invention are set forth under the summary. It has been indicated that all included compositions have strong, nonlinear compositions and are phase matchable. All listed materials have, in fact, been utilized as SHG elements, and nonlinear coefficients have been measured. It is useful to consider a possible mechanistic basis for the excellent device properties which have been observed. The following theoretical considerations are, however, presented solely to assist the experimenter or theoretician seeking to expand on the class of materials actualy enumerated. These considerations are not required to substantiate the inventive scope.

The $IO_3$ or $BrO_3$ ion has been observed to be constituted of a trigonal distribution of oxygen atoms about an $sp^3$ hybridized I or Br atom. This distribution results in a strongly acentric $XO_3-X=I$, Br ion. Under usual circumstances such trigonal groups are stacked so as to result in an octahedron of oxygen atoms about a central X atom.

The $IO_3^-$ ion or $BrO_3^-$ ion, however, also includes an unshared or nonbonded pair of electrons which, when the trigonal groupings are stacked, result in an increase in the oxygen-to-I or Br atom spacing where the electrons are interposed. The resulting octahedral distribution is no longer centric.

If the resulting acentricity is permitted by the cation, it characteristically gives rise to a large electric polarization which, in turn, results in a strong nonlinear coefficient within the claimed compounds.

(2) Preferred compositions

The claimed compounds together constitute but a part of the total number of materials which have been investigated. Many of the remainder are nonlinear. A few of those not enumerated, while strongly nonlinear, have insufficient birefringence to permit phase matching. A few are actually symmetric so that they are not nonlinear at all. Experimental studies have indicated the iodates to be most strongly nonlinear although certain of the bromates are useful. In general, the chlorates also tested were insufficiently nonlinear for most device purposes and the fluorates were of no significant device interest. Within the iodates, the preferred cations are potassium, rubidium, hydrogen, lithium, ammonium and thallium. All such compositions have nonlinear coefficients approaching or exceeding those of the materials most commonly used for these purposes at this time. All compositions claimed are substantially colorless and, therefore, have a transparency bandwidth including the visible.

(3) Physical characteristics

All included compositions are physically and chemically stable. However, the materials are considered to owe their value, at least in part, to the fact that they are growable from water solution; and it is therefore apparent that some limit must be placed on the tolerable exposure to moisture during use. Of course, even the optically polished surfaces of water-insoluble materials now in device use must be protected. Promising encapsulents include polymers which may be produced in situ, low melting glasses, and protective atmospheres. In general, vacuum packaging is not appropriate since there is at least initial volatilization of the volatile components until equilibrium is obtained. Where this is critical, such volatilization may be avoided by saturating the atmosphere with a powdered sample prior to inserting the crystal.

(4) Drawing

A significant aspect of the invention derives from the ease with which the included materials may be grown. Since every member of the claimed class is water growable and since apparatus for growth from water solution is available, it is expected that many of these materials will be produced in this manner.

Of course, many variations on solution growth may be utilized. Growth may be seeded or not, may involve dropping temperature or constant temperature, etc. Under some circumstances, growth may desirably proceed from a nonaqueous medium or even from a melt so that the following description should be considered as only exemplary.

The apparatus described in conjunction with FIG. 1 has been utilized in the growth of large, perfect, single crystals of many water soluble piezoelectrics, e.g., KDP, EDT, etc.

FIG. 1 is a view in section of a reciprocating rotary type crystallizer useful for growing seed crystals 2 to larger sized crystals 4 from a supersaturated nutrient solution 6, which is contained in container 8. The container 8, as illustrated in FIG. 1, is comprised of cylindrical walls, has a flat or nearly flat bottom portion 7, and is provided with a suitable cover 9. The plurality of seed crystals 2 to be grown are carried in full or in partial contact with the nutrient solution 6 by means of one or more radial type supports 10 which are secured to a centrally located and vertically disposed gyrator shaft 12, the upper portion of which may extend through a central opening in the container cover 9 and which may be carried as a whole by a suitable bearing 14, such as a ball bearing 14 and flange 16. The rotary gyrator shaft 12 may be driven by any suitable driver such as a belt 18 and pulley 20 arrangement; or through a clutch 22 by a suitable reciprocating or reversing electric motor 24 which may be carried by a suitable support frame 26. The gyrator shaft 12 may be driven by the reversing motor assembly 24 when carried by the tank cover 9 or by the separate frame 26, and may be geared or otherwise coupled to the gyrator shaft 12 so that the shaft 12 rotates at a suitable speed such as four revolutions per minute or more, and the direction of rotation is reversed every one, two or more revolutions as desired. The power capacity required of the motor 24 is sufficient to overcome the viscous drag effect of the growing crystals 4 through the nutrient solution 6. The ball bearing mounting 14 may be used when it is desired to reduce friction at points where the gyrator 12 is hung.

The temperature of the nurtient solution 6 may be automatically regulated by a suitable thermoregulator 30 extending through the cover 9 or through any other portion of the container 8 into the solution 6. The thermoregulator 30 may be connected by conductive wires 34 and 35 with a suitable power supply source or battery 36 for operating a relay 38 having a contact 40 which is connected in a circuit 41 with a suitable power or battery source 42 adapted for heating the resistors 44 and 46. The resistors 44 and 46 are mounted in a base portion 48 which is provided at or along the bottom 7 of the container 8. An additional resistor 50 may be heated by a suitable supply or battery source 52 and may be energized continuously or intermittently by a switch 54. In order to conserve heat supplied by the heating resistors 44, 46 and 50 to the nutrient solution 6 and to provide a more uniform temperature gradient for the nutrient solution 6, a band or girdle 60 composed of felt or other suitable heat insulating material may surround the bottom portion below the region 62 of the outer side walls of the container 8, or may surround the entire outer side walls thereof. Also, the cover 9 may be covered with a layer of felt 61 in order to control the temperature gradient and distribution of heat from the top to the bottom of the nutrient solution 6.

The container 8 may be a stainless steel tank or a glass jar, such as one made of "Pyrex" glass or other suitable material which is capable of withstanding a considerable amount of heat applied by the resistors 44, 46 and 50 at the bottom 7 thereof, and also which has no unfavorable chemical reaction with the nutrient solution 6. The container 8 is preferably of cylindrical form, and may have any suitable diameter and height, such as, for example, a diameter of 12 inches and upwards as desired, or with larger diameters such as 36 inches and much larger. The tank 8 may be closed at its top with a cover 9 made of glass or metal or other suitable material which may be held against a soft rubber or "neoprene" gasket with a suitable clamp. The lid or cover 9 may be sealed tight by tape, if desired. For cold weather operation and for high solution temperatures the sides of the tank 8 may be protected with a girdle of thick felt 60. The head and closure 9 for the tank 8 may consist of a stainless steel cover plate 9 provided with the bearing 14 for holding the gyrator 12. The small motor 24 with its reversing mechanism may be geared or otherwise coupled to the gyrator shaft 12.

Depending on the size of the tank 8 and the number of radial supports or arms 10 used therein, a large number of crystals 4 may be grown simultaneously in a single tank 8. A considerable number of tanks 8 may be arranged and operated in bank either separately, or together by means of any suitable mechanism such as the pulley and belt arrangement 18 and 20.

The base 48 for the tank 8 may be made of any suitable heat-resistant material and the heaters 44, 46 and 50 enclosed therein may be any suitable heaters such as resistance wire coils. The heaters 44 and 46 may have a heat energy capacity which is low relative to that of the nutrient solution 6 in order to keep the temperature fluctuation of the solution 6 caused by the thermostat controlled heaters 44 and 46 within small and tolerable limits. One or more heaters 44, 46 and 50 may be used. Where a single heater 44, 46 is used, it may be so constructed and located that the center of the bottom 7 of the container 8 receives the more intense heating relative to the heating supplied at the periphery of bottom 7 of the container 8. Where two heaters are used, one heater, such as the heater 50, may be located at the center of the bottom 7 of the container 8 and energized continuously until the temperature approaches so close to the ambient temperature that this constant heat input is no longer permissible, and the other heater such as the resistors 44 and 46 may be located concentrically with the first heater 50 and energized intermittently as is required to maintain the desired temperature of the nutrient solution 6. If the ambient temperature is too low or the temperature of the solution 6 is too far removed from the ambient temperature, heat losses may be prevented or reduced by a girdle of felt 60 of suitable size surrounding the container 8 in order to minimize the heat loss.

The automatic heat control and temperature regulating equipment may comprise any suitable type of thermoregulator 30 and relay 38. The thermoregulator 30 may be inserted in a glass well 32 which has enough liquid to cover the mercury bulb 31 of the thermoregulator 30. The thermoregulator 30 may be, for example, of the standard mercury in glass type, connected so as to operate one or more of the heaters 44, 46 and 50 through any suitable relay 38. The temperature sensitive end 31 of the thermoregulator 30 is inserted in the glass tube 32 which may be held in an opening in the cover 9 by means of a rubber stopper. The glass tube 32 extends into the nutrient solution 6 sufficiently to enable the temperature sensitive element 31 to have proper thermal contact with the nutrient solution 6. Water may be placed in the bottom of the glass tube 32 in just sufficient quantity to make contact with the temperature sensitive regions 31 of the instrument 30 inserted therein, but not enough to produce cooling due to evaporation of the water into the ambient atmosphere. A small piece of sponge rubber may be placed in the bottom of the thermoregulator well 32 to prevent breakage of the mercury bulb 31 of the thermoregulator 30.

Figure 2:
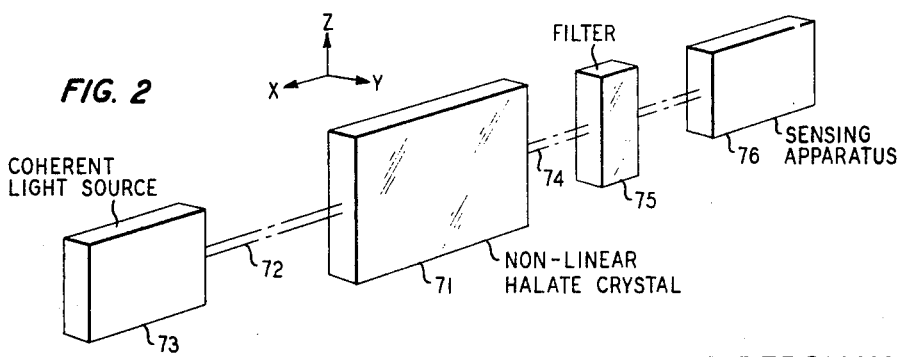
FIG. 2 is a schematic view of a nonlinear device using a material of the invention.

In FIG. 2 there is depicted a single crystal body 71 of a halate in accordance with the invention. A coherent electromagnetic beam 72 produced by source 73 is introduced into body 71, as shown. The resultant emerging beam 74 is then caused to pass through filter 75, and, upon departing, is detected by apparatus 76. For the SHG case, beam 72 is of a fundamental frequency while departing beam 74 additionally contains a wave of a frequency corresponding with a harmonic of beam 72. Filter 75 is of such nature as to pass only the wave of concern; in the SGH instance that of the harmonic. Apparatus 76 senses only that portion of the beam leaving filter 75.

The device of FIG. 2 may similarly be regarded as a three-frequency device, with beam 72 containing frequencies to be mixed or consisting of a pump frequency. Under these conditions, exiting beam 74 contains signal and idler frequencies as well as pump, representing three distinct values for nondegenerate operation. For any operation, whether two frequencies or three, efficiency is increased by resonance. Such may be accomplished by coating the surfaces of crystal 71, through which the beam enters and exits. This coating may be partially reflecting only for a generated frequency, as for example for the harmonic in SHG. For the three-frequency case, it is desirable to support both generated frequencies. In many instances, this cannot be accomplished by coating the face of the crystal, and it is necessary to provide at least one spaced adjustable mirror which may be positioned at such distance from the face of the crystal 71 as to support the frequencies of concern. Simultaneous support of the pump frequency may similarly be accomplished. However, the complication so introduced is justified only when the pump level requires it.

The invention has been described in terms of a limited number of exemplary embodiments. From the compositional standpoint, the listed compositions are exclusive although mixtures of various of the included compounds may be utilized. From another standpoint, however, the invention arises from the discovery of the noted nonlinear properties of these materials. The simple reference to an SHG and to a parametric device based on the sole figure is not to be considered limiting.

Device description has in general been sketchy. No attempt has been made to describe optimum or, in fact, any specific parametric or SHG cavity structure. This is a developing art and it seems inappropriate to devote substantial descriptive mattter to the various structures which have been examined. From the structural standpoint, the appended claims are general and none of the terminology set forth is intended to be construed as specific to any particular structure. For example, allusion to "means for extracting— . . . " may refer to a partially reflecting, dielectrically coated, confocal cavity end or simply to an optically polished flat surface.

What is claimed is:

1. Optical parametric device comprising a nonlinear medium together with means for introducing a beam of coherent electromagnetic radiation of a first frequency into said medium and means for extracting a beam of coherent electromagnetic radiation of a second frequency from said medium characterized in that the same medium consists essentially of at least one composition selected from the group consisting of:

| | |
|---|---|
| $HIO_3$ | $AgIO_3$ |
| $NH_4IO_3$ | $Zn(IO_3)_2$ |
| $RbIO_3$ | $TlBrO_3$ |
| $TlIO_3$ | $Cd(BrO_3)_2 \cdot 2H_2O$ |
| $KIO_3$ | $Hg(BrO_3)_2 \cdot 2H_2O$ |
| $LiIO_3$ | $KBrO_3$ |

2. Device of claim 1 in which the said second frequency is twice that of the first.

3. Device of claim 1 in which the said second frequency is lower than that of the said first frequency.

References Cited

UNITED STATES PATENTS 2,484,829  10/1949  Holden _____ 23—273

ROY LAKE, Primary Examiner

D. R. HOSTETTER, Assistant Examiner

U.S. Cl. X.R.

321—69; 330—4.5